(12) United States Patent
Long et al.

(10) Patent No.: US 8,424,373 B2
(45) Date of Patent: Apr. 23, 2013

(54) VARIATOR FAULT DETECTION SYSTEM

(75) Inventors: Charles F. Long, Pittsboro, IN (US); Darren J. Weber, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 303 days.

(21) Appl. No.: 12/943,386

(22) Filed: Nov. 10, 2010

(65) Prior Publication Data

US 2011/0138898 A1   Jun. 16, 2011

Related U.S. Application Data

(60) Provisional application No. 61/286,984, filed on Dec. 16, 2009.

(51) Int. Cl.
*G01M 13/02* (2006.01)

(52) U.S. Cl.
USPC ..................................................... 73/115.02

(58) Field of Classification Search ............... 73/115.01, 73/115.02, 115.03, 115.04, 116.04
See application file for complete search history.

(56) References Cited

U.S. PATENT DOCUMENTS

| | | | |
|---|---|---|---|
| 4,671,166 A | 6/1987 | Glaze et al. |
| 4,922,788 A | 5/1990 | Greenwood |
| 5,090,951 A | 2/1992 | Greenwood |
| 5,217,418 A | 6/1993 | Fellows et al. |
| 5,232,414 A | 8/1993 | Fellows et al. |
| 5,242,337 A | 9/1993 | Greenwood |
| 5,263,907 A | 11/1993 | Fellows |
| 5,308,297 A | 5/1994 | Greenwood |
| 5,308,298 A | 5/1994 | Lambert |
| 5,316,526 A | 5/1994 | Fellows |
| 5,338,268 A | 8/1994 | Greenwood |
| 5,395,292 A | 3/1995 | Fellows et al. |
| 5,401,221 A | 3/1995 | Fellows et al. |
| 5,423,727 A | 6/1995 | Fellows |
| 5,453,061 A | 9/1995 | Fellows |
| 5,521,819 A | 5/1996 | Greenwood |
| 5,564,993 A | 10/1996 | Robinson |
| 5,564,998 A | 10/1996 | Fellows |
| 5,643,121 A | 7/1997 | Greenwood et al. |
| 5,667,456 A | 9/1997 | Fellows |
| 5,766,105 A | 6/1998 | Fellows et al. |

(Continued)

FOREIGN PATENT DOCUMENTS

| | | |
|---|---|---|
| GB | 2361510 | 10/2001 |
| GB | 2368618 | 5/2002 |

(Continued)

OTHER PUBLICATIONS

International Search Report and the Written Opinion for International Application No. PCT/US2010/056242, dated Jan. 10, 2011, (1o pages).

(Continued)

*Primary Examiner* — Eric S McCall
(74) *Attorney, Agent, or Firm* — Barnes & Thornburg LLP (57) ABSTRACT

A variator fault detection system for a continuously variable transmission is incorporated into a hydraulic control circuit that controls fluid pressure applied to a variator of the continuously variable transmission. The hydraulic control circuit for the variator includes a number of electrically-controlled shift valves and pressure control valves. Sensing devices are multiplexed to these valves to detect a number of different possible fault states relating to the variator shift valves and the variator pressure control valves.

21 Claims, 7 Drawing Sheets

U.S. PATENT DOCUMENTS

| | | | |
|---|---|---|---|
| 5,820,508 | A | 10/1998 | Konig et al. |
| 5,820,513 | A | 10/1998 | Greenwood |
| 5,895,337 | A | 4/1999 | Fellows et al. |
| 5,938,557 | A | 8/1999 | Greenwood |
| 5,971,885 | A | 10/1999 | Greenwood et al. |
| 6,030,310 | A | 2/2000 | Greenwood et al. |
| 6,066,067 | A | 5/2000 | Greenwood |
| 6,071,209 | A | 6/2000 | Greenwood |
| 6,224,509 | B1 | 5/2001 | Gierling |
| 6,273,839 | B1 | 8/2001 | Dutson |
| 6,306,060 | B1 | 10/2001 | Dutson et al. |
| 6,312,356 | B1 | 11/2001 | Greenwood |
| 6,464,614 | B2 | 10/2002 | Dutson |
| 6,626,793 | B1 | 9/2003 | Greenwood |
| 6,666,791 | B1 | 12/2003 | Greenwood |
| 6,979,276 | B2 | 12/2005 | Murray |
| 7,018,320 | B2 | 3/2006 | Robinson et al. |
| 7,056,261 | B2 | 6/2006 | Fuller |
| 7,140,993 | B2 | 11/2006 | Long et al. |
| 7,160,226 | B2 | 1/2007 | Fuller |
| 7,255,214 | B2 | 8/2007 | Long et al. |
| 7,278,951 | B2 | 10/2007 | Fuller |
| 7,285,066 | B2 | 10/2007 | Long et al. |
| 7,288,039 | B2 | 10/2007 | Foster et al. |
| 7,318,786 | B2 | 1/2008 | Greenwood et al. |
| 7,322,899 | B1 | 1/2008 | Long et al. |
| 7,392,892 | B2 | 7/2008 | Long et al. |
| 7,395,837 | B2 | 7/2008 | Foster et al. |
| 7,396,306 | B2 | 7/2008 | Long et al. |
| 7,407,459 | B2 | 8/2008 | Greenwood et al. |
| 7,491,149 | B2 | 2/2009 | Greenwood et al. |
| 7,510,496 | B2 | 3/2009 | Long et al. |
| 7,517,296 | B2 | 4/2009 | Foster et al. |
| 7,530,916 | B2 | 5/2009 | Greenwood |
| 7,563,194 | B2 | 7/2009 | Murray |
| 7,614,973 | B2 | 11/2009 | Parthuisot et al. |
| 7,625,309 | B2 | 12/2009 | Fuller |
| 7,632,208 | B2 | 12/2009 | Greenwood et al. |
| 7,637,841 | B2 | 12/2009 | Dutson |
| 7,651,427 | B2 | 1/2010 | Long et al. |
| RE42,131 | E | 2/2011 | Long et al. |
| 7,951,041 | B2 | 5/2011 | Dutson |
| 7,955,210 | B2 | 6/2011 | Greenwood et al. |
| 8,037,988 | B2 | 10/2011 | Long et al. |
| 8,046,991 | B2 | 11/2011 | Long |
| 2004/0038773 | A1 | 2/2004 | Robinson et al. |
| 2005/0143216 | A1 | 6/2005 | Greenwood et al. |
| 2005/0176547 | A1 | 8/2005 | DeFreitas |
| 2006/0142110 | A1 | 6/2006 | Greenwood et al. |
| 2006/0160656 | A1 | 7/2006 | Dutson |
| 2007/0072736 | A1 | 3/2007 | Defreitas et al. |
| 2007/0099739 | A1 | 5/2007 | Foster et al. |
| 2007/0112495 | A1 | 5/2007 | Murray |
| 2007/0142163 | A1 | 6/2007 | Murray |
| 2007/0275817 | A1 | 11/2007 | Newall |
| 2008/0006107 | A1 | 1/2008 | Dreher et al. |
| 2008/0146399 | A1 | 6/2008 | Oliver et al. |
| 2008/0153659 | A1 | 6/2008 | Greenwood |
| 2008/0269001 | A1 | 10/2008 | Greenwood et al. |
| 2009/0048054 | A1 | 2/2009 | Tsuchiya et al. |
| 2009/0062065 | A1 | 3/2009 | Field et al. |
| 2009/0132135 | A1 | 5/2009 | Quinn, Jr. et al. |
| 2009/0203486 | A1 | 8/2009 | Murray |
| 2009/0305840 | A1 | 12/2009 | Oliver |
| 2011/0140017 | A1 | 6/2011 | Long et al. |
| 2011/0143882 | A1 | 6/2011 | Long et al. |
| 2011/0144872 | A1 | 6/2011 | Long et al. |
| 2011/0144925 | A1 | 6/2011 | Long et al. |

FOREIGN PATENT DOCUMENTS

| | | |
|---|---|---|
| GB | 2384531 | 7/2003 |
| GB | 2397630 | 7/2004 |
| GB | 2410302 | 7/2005 |
| GB | 2418235 | 3/2006 |
| GB | 2438412 | 11/2007 |
| GB | 2440746 | 2/2008 |
| GB | 2455030 | 6/2009 |
| GB | 2459857 | 11/2009 |
| GB | 2460237 | 11/2009 |
| GB | 2470717 | 12/2010 |
| GB | 2474870 | 5/2011 |

OTHER PUBLICATIONS

Torotrak Full toroidal variator (http://www.torotrak.com/IVT/works/variator.htm) 5 pages (accessed Sep. 24, 2009).
U.S. Appl. No. 61/286,974, filed Dec. 16, 2009, Long et al.
U.S. Appl. No. 61/287,031, filed Dec. 16, 2009, Long et al.
U.S. Appl. No. 61/287,038, filed Dec. 16, 2009, Long et al.
U.S. Appl. No. 61/287,003, filed Dec. 16, 2009, Long et al.

VARIATOR FAULT DETECTION SYSTEM

This application claims the benefit of U.S. Provisional Patent Application Ser. No. 61/286,984, filed Dec. 16, 2009, which is incorporated herein by this reference in its entirety.

TECHNICAL FIELD

The present disclosure relates generally to vehicle transmissions that have a ratio varying unit, and more particularly, to a variator fault detection system for a transmission having a ratio varying unit of the full toroidal type.

BACKGROUND

In some vehicle transmissions, a ratio varying unit ("variator") is used to provide a continuous variation of transmission ratio rather than a series of predetermined ratios. These transmissions may be referred to as continuously variable transmissions, infinitely variable transmissions, toroidal transmissions, continuously variable transmissions of the full toroidal race-rolling traction type, or similar terminology. In such transmissions, the variator is coupled between the transmission input and the transmission output via gearing and one or more clutches. In the variator, torque is transmitted by the frictional engagement of variator disks and rollers separated by a traction fluid.

The variator torque is controlled by a hydraulic circuit, which includes hydraulic actuators (i.e., pistons) that apply an adjustable force to the rollers. The force applied by the hydraulic actuator is balanced by a reaction force resulting from the torques transmitted between the surfaces of the variator disks and the rollers. The end result is that in use, each roller moves and precesses to the location and tilt angle required to transmit a torque determined by the force applied by the hydraulic actuators. A difference in the forces applied to the rollers changes the rollers' tilt angle and thus, the variator ratio. A change in the rollers' tilt angle thus results not only in a net torque at the transmission output but could also result in a change in torque direction. The direction of the torque output determines whether the torque application is positive or negative.

SUMMARY

According to one aspect of this disclosure, a variator fault detection circuit, comprising a first shift valve movable from a first position to a second position axially spaced from the first position in a first valve chamber of a hydraulic control circuit for a continuously variable transmission. The first shift valve has a first port in fluid communication with a variator of the continuously variable transmission and a second port axially spaced from the first port. The circuit also includes a second shift valve movable from a first position to a second position axially spaced from the first position in a second valve chamber of the hydraulic control circuit of the continuously variable transmission. The second shift valve has a first port in fluid communication with the variator of the continuously variable transmission and a second port axially spaced from the first port. The circuit also includes a first pressure switch coupled to the second port of the first shift valve, a second pressure switch coupled to the second port of the second shift valve, a first electro-hydraulic actuator coupled to the first shift valve, and a second electro-hydraulic actuator coupled to the second shift valve.

In some embodiments, the first position of the first shift valve is a destroked position and the second position of the first shift valve is a stroked position. Also in some embodiments, the first position of the second shift valve is a destroked position and the second position of the second shift valve is a stroked position.

The variator fault detection circuit may include a first trim valve operable to output variable fluid pressure, where the first trim valve is fluidly coupled to the first port of the first shift valve when the first shift valve is in the first position, and the first trim valve is disconnected from the first port of the first shift valve when the first shift valve is in the second position.

The variator fault detection circuit may include a second trim valve operable to output variable fluid pressure, wherein the second trim valve is fluidly coupled to the first port of the second shift valve when the second shift valve is in the first position, and the second trim valve is disconnected from the first port of the second trim valve when the second shift valve is in the second position.

According to another aspect of this disclosure, a shift valve fault detection method executable by an electronic control unit using a variator fault detection circuit includes detecting a status of the first pressure switch, detecting a status of the first electro-hydraulic actuator, and determining whether a fault has occurred at the first shift valve based on the status of the first pressure switch and the status of the first electro-hydraulic actuator.

The shift valve fault detection method may include initiating a failure recovery action in response to determining that a fault has occurred at the first shift valve. The shift valve fault detection method may include detecting a status of the second pressure switch, detecting a status of the second electro-hydraulic actuator, and determining whether a fault has occurred at the second shift valve based on the status of the second pressure switch and the status of the second electro-hydraulic actuator.

According to yet another aspect of this disclosure, a variator fault detection circuit includes a first shift valve movable from a first position to a second position axially spaced from the first position in a first valve chamber of a hydraulic control circuit for a continuously variable transmission. The first shift valve has a first port in fluid communication with a variator of the continuously variable transmission and a second port axially spaced from the first port. The variator fault detection circuit also includes a second shift valve movable from a first position to a second position axially spaced from the first position in a second valve chamber of the hydraulic control circuit of the continuously variable transmission. The second shift valve has a first port in fluid communication with the variator of the continuously variable transmission and a second port axially spaced from the first port. The circuit also includes a first pressure switch coupled to the second port of the first shift valve, a second pressure switch coupled to the second port of the second shift valve, and a variator fault valve selectively coupled to the second port of the first shift valve and selectively coupled to the second port of the second shift valve.

The variator fault valve may have a first position and a second position axially spaced from the first position, where the variator fault valve outputs fluid pressure to at least one of the second port of the first shift valve and the second port of the second shift valve when the variator fault valve is in the second position. The variator fault valve may only output fluid pressure to the second port of the first shift valve when the first shift valve is in the first position and the variator fault valve is in the second position. The variator fault valve may only output fluid pressure to the second port of the second shift valve when the second shift valve is in the first position and the variator fault valve is in the second position.

According to another aspect of this disclosure, a variator fault detection method executable by an electronic control unit using a variator fault detection circuit includes detecting a status of the first pressure switch, detecting a status of the second pressure switch, and determining whether a variator fault has occurred based on the status of the first pressure switch and the status of the second pressure switch. The determining step of the method may include determining whether the first and second pressure switches are both actuated. The variator fault detection method may include initiating a fault recovery action if the status of the first pressure switch is actuated and the status of the second pressure switch is actuated.

According to a further aspect of this disclosure, a variator trim system fault detection circuit includes a first shift valve movable from a first position to a second position axially spaced from the first position in a first valve chamber of a hydraulic control circuit for a continuously variable transmission. The first shift valve has a first port in fluid communication with the variator of a continuously variable transmission and a second port axially spaced from the first port. The variator trim system fault detection circuit also includes a second shift valve movable from a first position to a second position axially spaced from the first position in a second valve chamber of the hydraulic control circuit of the continuously variable transmission. The second shift valve has a first port in fluid communication with the variator of the continuously variable transmission and a second port axially spaced from the first port.

The variator trim system fault detection circuit also includes a first trim valve operable to output variable fluid pressure, where the first trim valve is fluidly coupled to the first port of the first shift valve when the first shift valve is in the first position, and the first trim valve is disconnected from the first port of the first shift valve when the first shift valve is in the second position.

The variator trim system fault detection circuit also includes a second trim valve operable to output variable fluid pressure, where the second trim valve is fluidly coupled to the first port of the second shift valve when the second shift valve is in the first position, and the second trim valve is disconnected from the first port of the second trim valve when the second shift valve is in the second position.

The variator trim system fault detection circuit also includes a first pressure switch coupled to the second port of the first shift valve, a second pressure switch coupled to the second port of the second shift valve, a first electro-hydraulic actuator coupled to the first shift valve, a second electro-hydraulic actuator coupled to the second shift valve, and a variator fault valve selectively coupled to the second port of the first shift valve and selectively coupled to the second port of the second shift valve.

Each of the first and second shift valves may have a valve head and a spring pocket axially spaced from the valve head, where the variator trim system fault detection circuit includes a first passage fluidly coupling the valve head of the first shift valve to the spring pocket of the second shift valve. The variator trim system fault detection circuit may include a second passage fluidly coupling the valve head of the second shift valve to the spring pocket of the first shift valve.

According to another aspect of this disclosure, a variator trim system fault detection method executable by an electronic control unit using a variator trim system fault detection circuit includes detecting a status of the first pressure switch, detecting a status of the second pressure switch, detecting a status of the second electro-hydraulic actuator, and determining whether a fault has occurred at the first trim valve based on the status of the first pressure switch, the status of the second pressure switch, and the status of the second electro-hydraulic actuator.

The variator trim system fault detection method may include initiating a failure recovery action in response to determining that a fault has occurred at the first trim valve. The variator trim system fault detection method may include detecting a status of the first electro-hydraulic actuator, and determining whether a fault has occurred at the second shift valve based on the status of the first pressure switch, the status of the second pressure switch, and the status of the first electro-hydraulic actuator.

According to yet another aspect of this disclosure, a variator control circuit includes a plurality of variator control devices in fluid communication with each other and with a variator of a continuously variable transmission, and a maximum of two sensing devices configured to detect faults occurring in any one of the plurality of variator control devices.

In the variator control circuit, the plurality of variator control devices may include a pair of shift valves and a plurality of trim valves, where each of the shift valves has a first port and a second port axially spaced from the first port, and each of the trim valves is selectively coupled to the first port of a shift valve, and each of the sensing devices is coupled to the second port of one of the shift valves. The variator control circuit may include a variator fault valve selectively coupled to the second port of the shift valves. In the variator control circuit, each of the shift valves may have a valve head and a spring pocket, and the circuit may include a first passage fluidly coupling the valve head of the first shift valve to the spring pocket of the second shift valve and a second passage fluidly coupling the valve head of the second shift valve to the spring pocket of the first shift valve.

Patentable subject matter may include one or more features or combinations of features shown or described anywhere in this disclosure including the written description, drawings, and claims.

BRIEF DESCRIPTION OF THE DRAWINGS

The detailed description refers to the following figures in which.

In figures that depict schematic illustrations, the components may not be drawn to scale, and lines shown as connecting the various blocks and components shown therein represent connections which, in practice, may include one or more electrical, mechanical and/or fluid connections, passages, communication links, couplings or linkages, as will be understood by those skilled in the art and as described herein. In general, like structural elements on different figures refer to identical or functionally similar structural elements, although reference numbers may be omitted from certain views of the drawings for ease of illustration.

DETAILED DESCRIPTION

Aspects of this disclosure are described with reference to illustrative embodiments shown in the accompanying drawings and described herein. While the disclosure refers to these illustrative embodiments, it should be understood that the present invention as claimed is not limited to the disclosed embodiments. For example, while certain aspects of the disclosure are discussed herein in the context of a continuously variable transmission, it will be understood by those skilled in the art that aspects of the present disclosure are applicable to other types and configurations of transmissions.

Also, transmissions of the type discussed herein may be referred to by a number of different terms, including continuously variable transmissions, infinitely variable transmissions, toroidal transmissions, continuously variable transmissions of the full toroidal race-rolling traction type, or similar terminology. In this disclosure, for ease of discussion, the term "continuously variable transmission" is used to refer to any of those types of transmissions in which the ratios may be controlled by a ratio varying unit, alternatively or in addition to being controlled by a set of gears that provide fixed, stepped ratios.

Figure 1A:
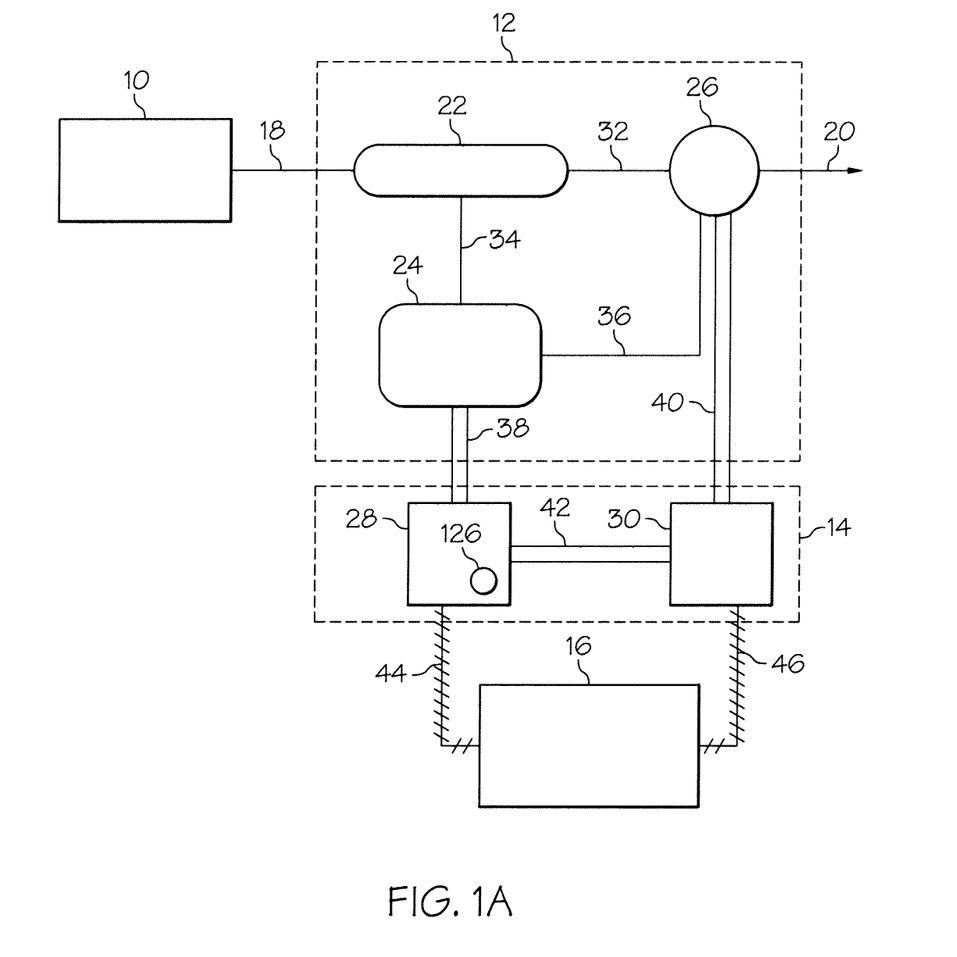
FIG. 1A is a schematic showing a variator fault detection system in the context of an exemplary vehicle transmission.

In FIG. 1A, a variator fault detection system 126 is shown in relation to other components of a vehicle power train. The variator fault detection system 126 is used in a hydraulic control circuit 28 for a transmission 12. In the illustrations, the transmission 12 is a transmission having a ratio varying unit of the full toroidal traction type. Transmissions of this type are available from Torotrak Development, Ltd. of Lancashire, United Kingdom, for example.

The transmission 12 is coupled to a transmission input shaft 18 to receive torque output by a vehicle drive unit 10. The drive unit 10 includes an internal combustion engine, such as a spark-ignited engine or diesel engine, an engine-electric motor combination, or the like.

The transmission 12 uses a ratio varying unit ("variator") 24 to provide a continuous variation of transmission ratio. The variator 24 is coupled between the transmission input shaft 18 and the transmission output shaft 20 via gearing 22 and one or more clutches 26. The linkages 32, 34, 36 are used to schematically represent mechanical connections between components of the transmission 12, as will be understood by those skilled in the art. The linkage 36 is representative of a variator output shaft.

Figure 1B:
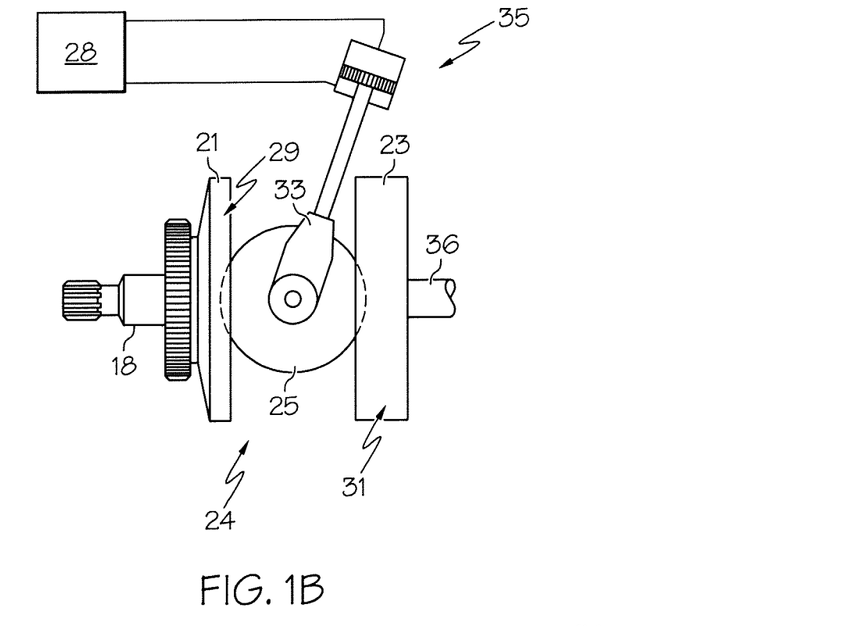
FIG. 1B is a partially schematic simplified side view of a portion of a variator suitable for use in the transmission of FIG. 1A.
Figure 1C:
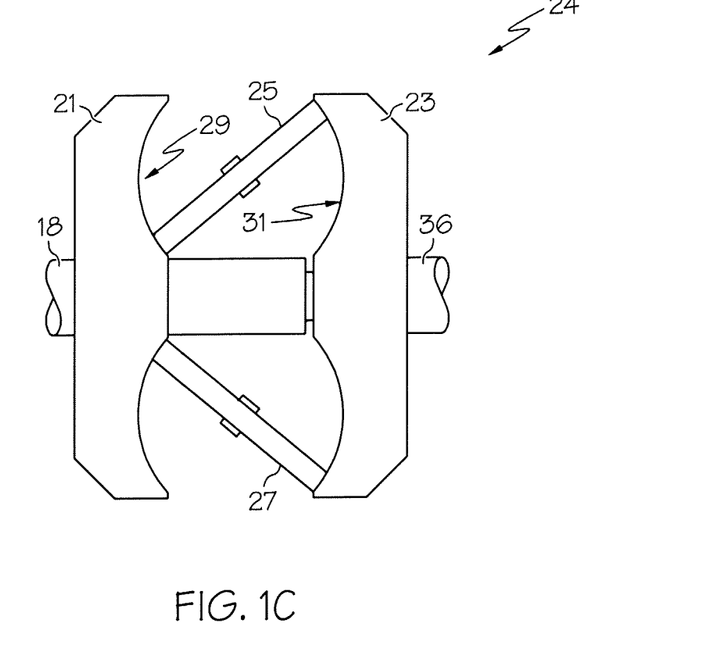
FIG. 1C is a simplified top view of the variator of FIG. 1B, with portions omitted for clarity.

FIGS. 1B and 1C illustrate components of the variator 24. Inside the variator 24, there is a pair of disks 21, 23. The input disk 21 is coupled to and driven by the transmission input shaft 18, while the output disk 23 is coupled to the variator output shaft 36. The space between the inner surfaces 29, 31 of the disks 21, 23 forms a hollow doughnut shape or 'toroid.' A number of rollers 25, 27 are positioned within the toroidal space defined by the surfaces 29, 31. The rollers 25, 27 transmit drive from the input disk 21 to the output disk 23 via a traction fluid (not shown).

Each of the rollers 25, 27 is coupled to a hydraulic actuator 35 by a carriage 33. The hydraulic pressure in the actuators 35 is adjusted by the variator control circuit 28 as described below with reference to FIG. 2. Varying the pressures in the actuators 35 changes the force applied by the actuators 35 to their respective rollers 25, 27, to create a range of torque within the variator 24. The rollers 25, 27 are capable of translational motion and also rotate about a tilt axis relative to the variator disks 21, 23. FIG. 1C shows an example of the rollers 25, 27 positioned at a tilt angle relative to the surfaces 29, 31, with the actuators 35 omitted for clarity.

In one illustrative implementation, the variator 24 includes two pairs of input and output disks 21, 23, and there are three rollers positioned in the toroidal space defined by the disks of each pair, for a total of six rollers. Each roller is coupled to a hydraulic actuator 35, for a total of six hydraulic actuators. These additional disks, rollers, and actuators are omitted from the drawings for clarity.

The variator fault detection system 126 may be used with other variator implementations, as well. Alternative embodiments of the variator 24 may include a lesser or greater number of disks, rollers, and/or actuators. In one such embodiment, one hydraulic actuator is used to control all of the rollers. In another embodiment, a compact lever arrangement is used in place of the inline piston design shown in FIG. 1B. Moreover, some embodiments may use a partially toroidal rather than a full toroidal configuration.

The variator 24 and the clutches 26 of the transmission 12 are controlled by an electro-hydraulic control system 14. The electro-hydraulic control system 14 has a variator control circuit 28 and a clutch control circuit 30. In general, the linkages 38, 40, 42 represent hydraulic fluid connections between components of the variator 24 and the variator control circuit 28, between the clutch or clutches 26 and the clutch control circuit 30, and between the variator control circuit 28 and the clutch control circuit 30.

The variator control circuit 28 controls the variator ratio. Aspects of the variator control circuit 28 are described below with reference to FIGS. 2-6. The clutch control circuit 30 controls the application and release of the clutches 26. Aspects of the clutch control circuit 30 are the subject of U.S. Provisional Patent Application Ser. No. 61/287,031, filed Dec. 16, 2009, and U.S. Provisional Patent Application Ser. No. 61/287,038, filed Dec. 16, 2009, both of which are incorporated herein by this reference in their entirety.

The operation of the electro-hydraulic control system 14 is controlled by an electronic control unit 16. The linkages 44, 46 are used to schematically represent electrical connections between the electronic control unit 16 and the electro-hydraulic control circuits 28, 30 of the electro-hydraulic control system 14, as will be understood by those skilled in the art. The linkages 44, 46 may include insulated wiring, wireless links, or other suitable connections for exchanging data, communications and computer instructions. The electronic control unit 16 may be implemented as multiple separate logical or physical structures or as a single unit. For example, the electronic control unit 16 may control aspects of the operation of the drive unit 10 in addition to the transmission 12, or the electronic control unit may comprise a number of modules that control different aspects of the operation of the drive unit 10 and/or transmission 12.

The electronic control unit 16 includes computer circuitry configured to control the operation of the transmission 12 based on inputs from various components of the transmission 12 and, in some embodiments, from the drive unit 10. Such inputs may include digital and/or analog signals received from sensors, controls or other like devices associated with the vehicle components. The electronic control unit 16 processes inputs and parameters and issues electrical control signals to various components of the electro-hydraulic control system 14.

For example, the electronic control unit 16 monitors the status of valves in the electro-hydraulic control system 14. Sensing devices such as pressure switches or the like detect changes in valve positions within the electro-hydraulic control system 14 and send electrical signals to the electronic control unit 16 to indicate detected changes. The electronic control unit 16 executes computerized logic and instructions to determine, based on the signals received from the sensing devices, whether a fault has occurred in any of the components of the electro-hydraulic control system 14.

The variator fault detection system 126 is incorporated into the variator control circuit 28. The variator control circuit 28 applies a controlled force to the variator rollers by adjusting the pressures in the hydraulic actuators 35. As shown schematically in FIG. 2, each of the hydraulic actuators 35 includes a pair of opposing faces 70, 72, which are movable within their respective cylinders 74, 76. Each of the opposing faces 70, 72 is exposed to hydraulic fluid pressure so that the force applied by the actuator 35 to its respective roller is determined by the difference in the two pressures. Accordingly, the force applied by the actuators 35 to the rollers has both a magnitude and a direction. For example, the direction of the force may be considered positive if the face 70 receives greater pressure than the face 72 and negative if the face 72 receives greater pressure than the face 70, or vice versa. Illustratively, each of the hydraulic actuators 35 includes a double-acting piston and cylinder arrangement.

Figure 2:
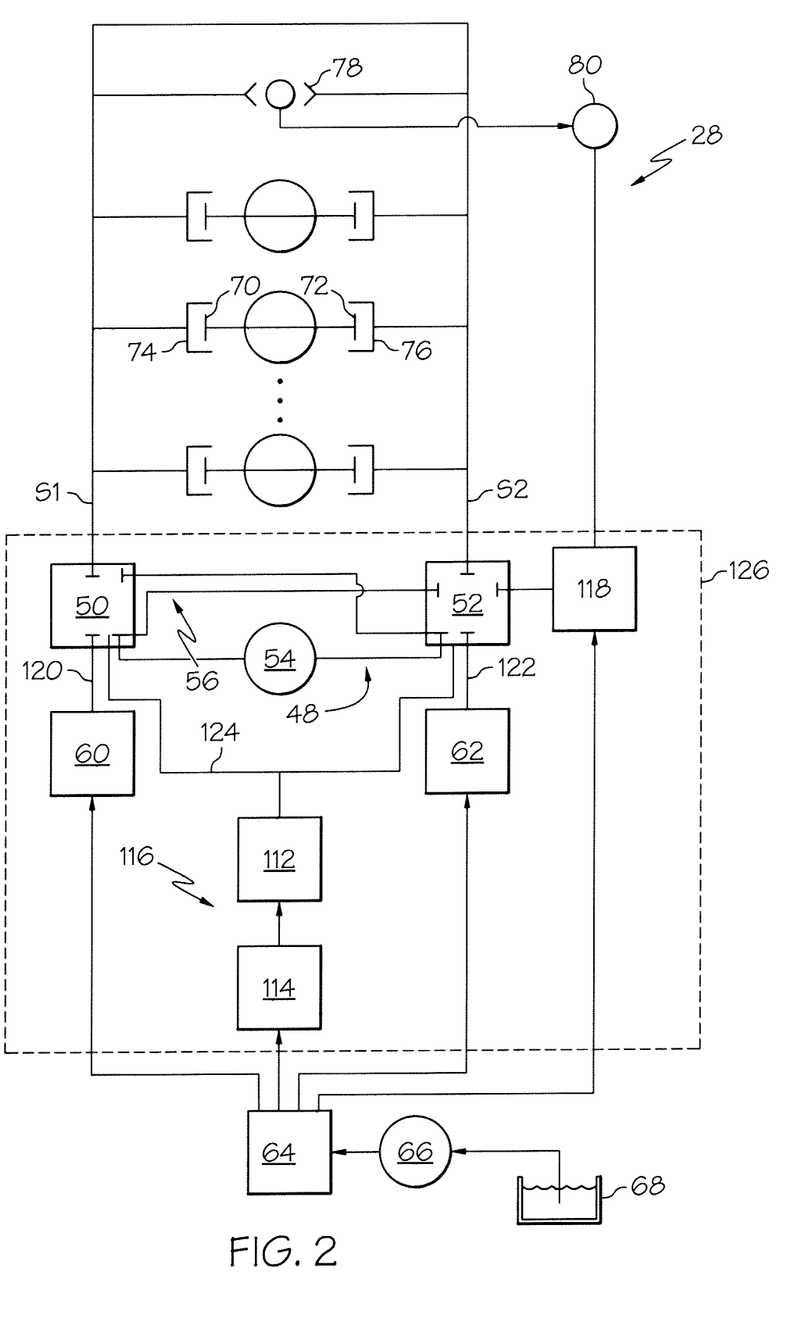
FIG. 2 is a schematic showing the variator fault detection system of FIG. 1A in a hydraulic control circuit for the transmission of FIG. 1A.

The pressure applied to one side (e.g., the face 70) of the actuator 35 is commonly referred to as "S1," while the pressure applied to the other side (e.g., the face 72) of the actuator 35 is commonly referred to as "S2." The difference between the S1 and S2 pressures determines the force applied by the actuators 35 to their respective rollers.

The actuators 35 and the fluid lines S1, S2 are configured to ensure that the actuators 35 all react the same way, so that all of the rollers 25 of the variator 24 are continuously maintained at the same pressure differential. A "higher pressure wins" valve 78 connects whichever of the two lines S1, S2 is at a higher pressure to an end load arrangement 80.

The variator control circuit 28 adjusts the pressures in the lines S1, S2. A source of hydraulic fluid (i.e., a sump) 68 supplies fluid to a pump 66. Electronically-controlled valves 60, 62, 64 regulate the fluid pressure that is applied to the lines S1 and S2. The valve 64 is a type of pressure control valve commonly referred to as a main modulator valve. The main modulator valve 64 modulates the fluid pressure according to a predetermined desired pressure level for the variator control circuit 28.

The valves 60, 62 are trim valves, each of which includes a variable-bleed solenoid or similar device that outputs a variable fluid pressure in response to signals from the electronic control unit 16. The trim valve 60 is fluidly coupled to a shift valve 50 by a fluid passage 120, and the trim valve 62 is fluidly coupled to a shift valve 52 by a fluid passage 122. The trim valve 60 controls the application of fluid pressure to the line S1 through the shift valve 50, and the trim valve 62 controls the application of fluid pressure to the line S2 through the shift valve 52.

Figure 3:
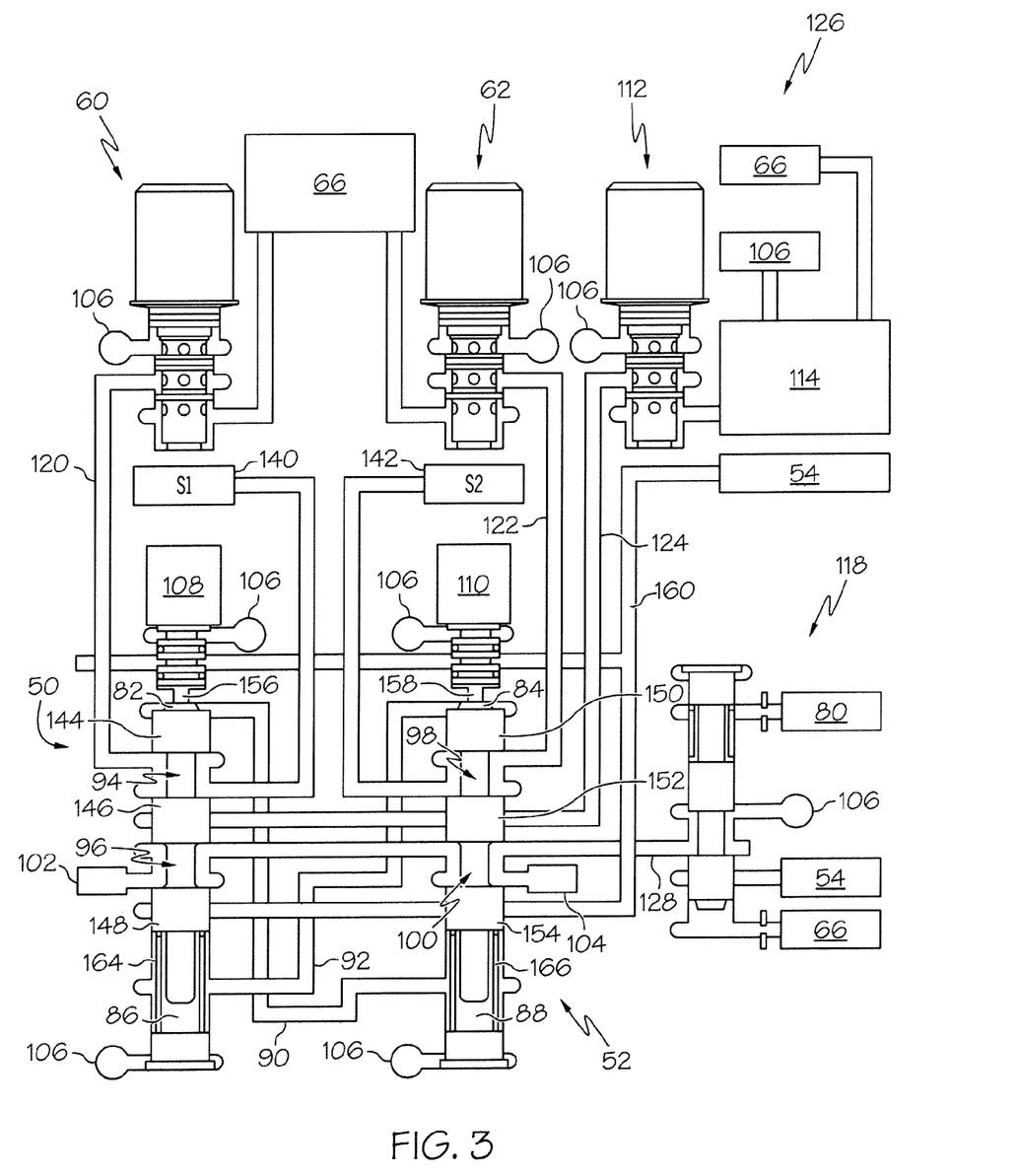
FIGS. 3-6 are schematic representations of different states of the variator fault detection system of FIG. 1A.
Figure 4:
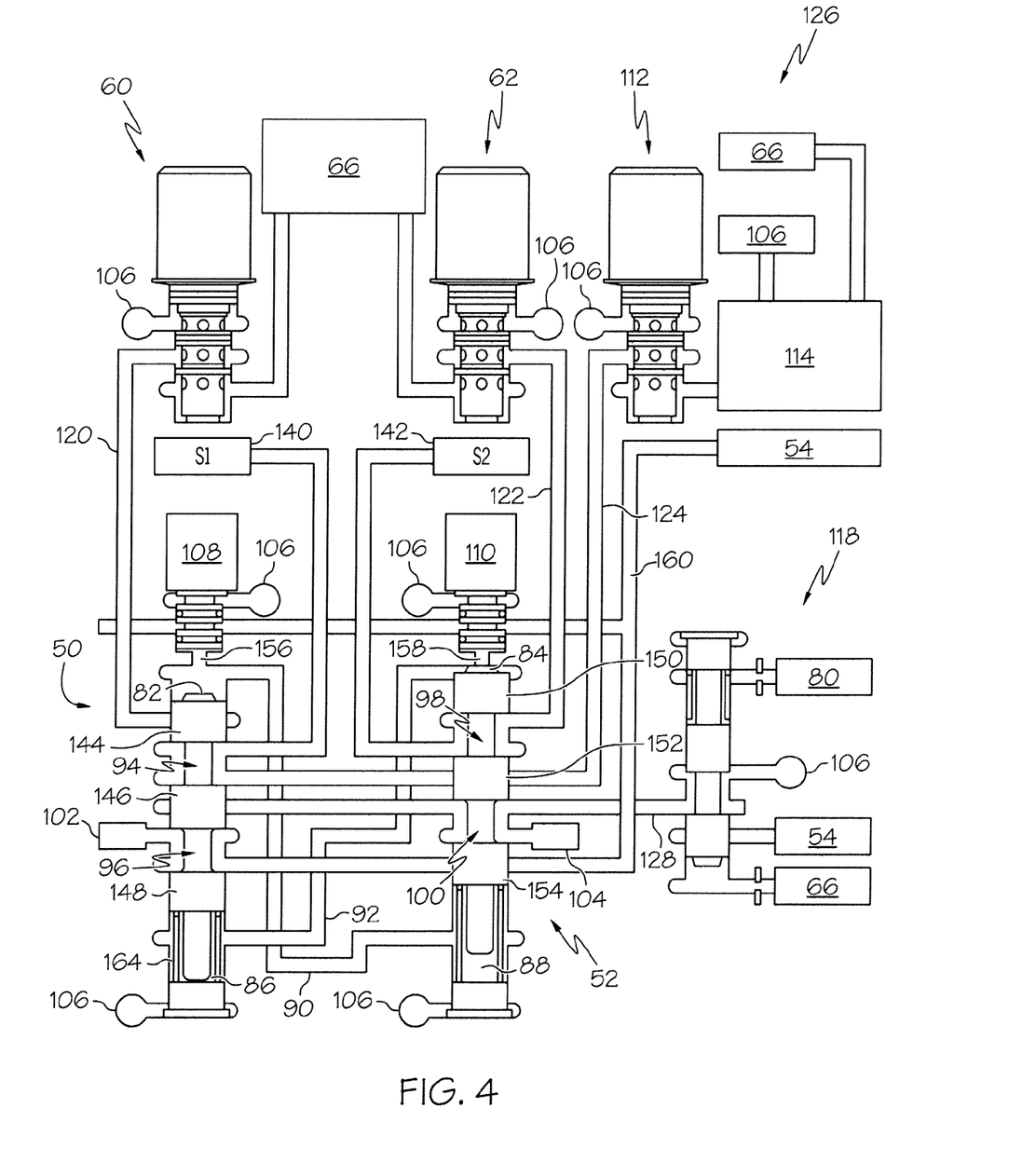
Figure 5:
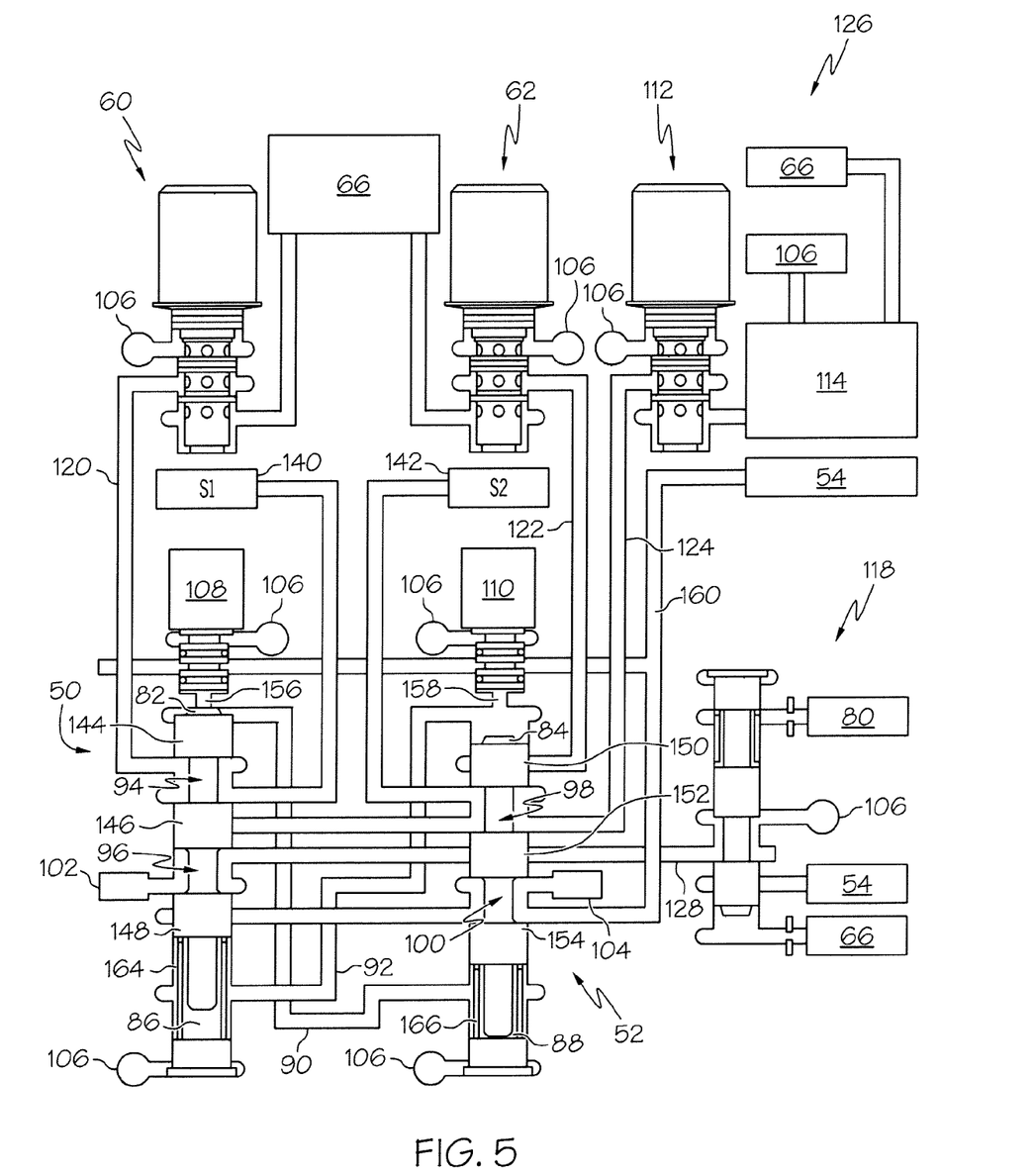
Figure 6:
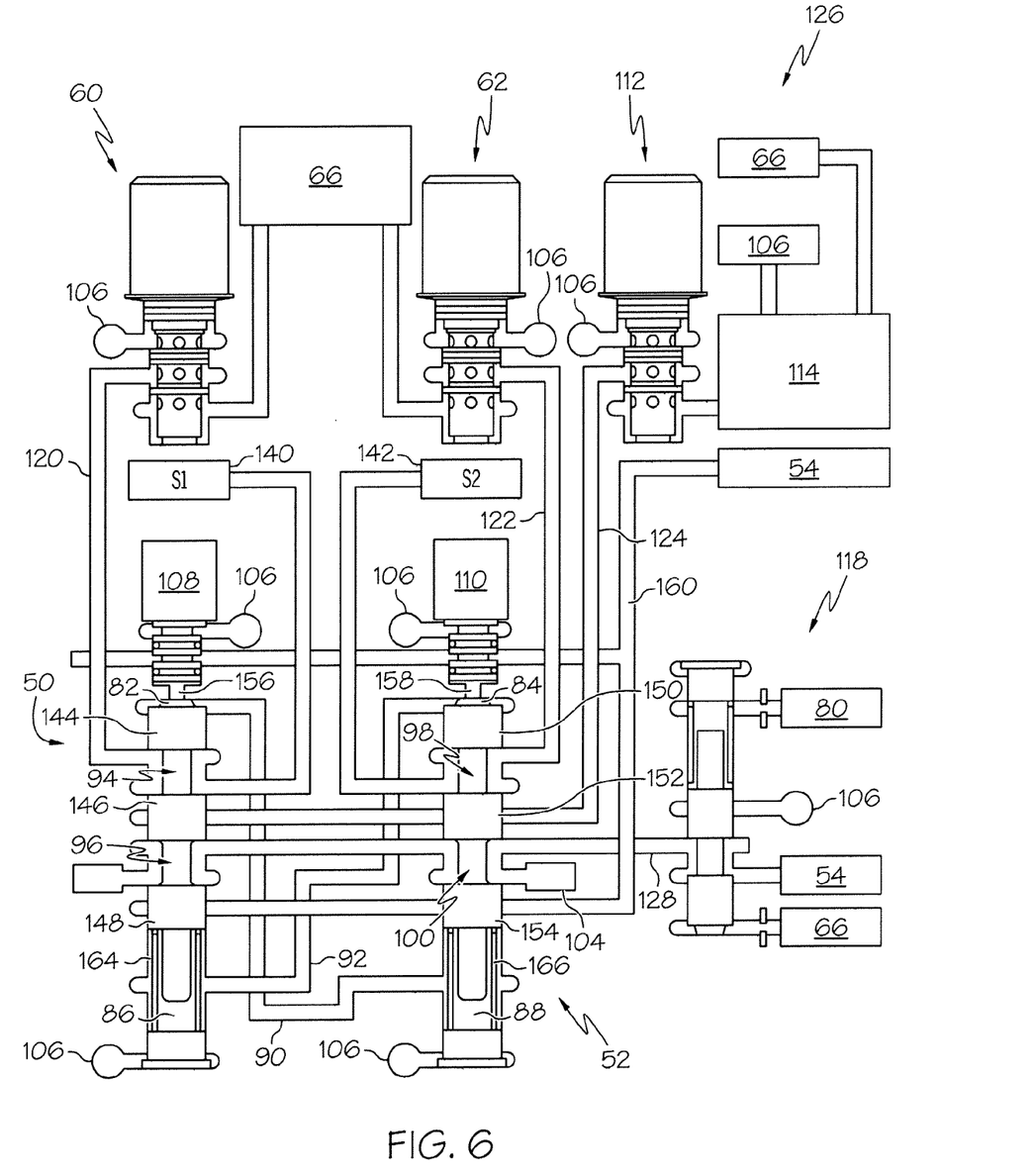

The variator fault detection system 126 includes a variator lockout valve system 116. In the variator lockout valve system 116, the position of the shift valve 50 determines whether or not the trim valve 60 supplies fluid pressure to the line S1, and the position of the shift valve 52 determines whether or not the trim valve 62 supplies fluid pressure to the line S2. The trim valve 60 is in fluid communication with the line S1 when the shift valve 50 is destroked, as shown in FIGS. 3, 5 and 6 described below. The trim valve 62 is in fluid communication with the line S2 when the shift valve 52 is destroked, as shown in FIGS. 3, 4, and 6 described below.

The variator lockout valve system 116 includes a trim valve 112 and a shift valve 114. The trim valve 112 is fluidly coupled to the shift valves 50, 52 by a passage 124. The trim valve 112 may be used to supply fluid pressure to the line S1 in the event that the trim valve 60 fails, and the trim valve 112 may be used to supply fluid pressure to the line S2 in the event that the trim valve 62 fails.

Aspects of the variator lockout valve system 116, including the trim valve substitution scheme, are described in U.S. Provisional Patent Application Ser. No. 61/286,974, filed Dec. 16, 2009, which is incorporated herein by this reference in its entirety.

The variator fault detection system 126 also includes a fast valve actuation system 48, which is coupled between the trim valves 60, 62 and the rest of the variator control circuit 28. The fast valve actuation system 48 has its own fluid circuit 56, which is coupled to a fluid supply 54. The fluid circuit 56 includes a pair of passages 90, 92, which fluidly couple the respective valve heads and spring pockets of the shift valves 50, 52 to one another as best shown in FIGS. 3-6.

In the variator fault detection system 126, the arrangement of the passages 90, 92 of the fast valve actuation system 48 prevents a state in which both of the shift valves 50, 52 are stroked at the same time. The fluid passage 90 couples the output passage 156 of the electro-hydraulic actuator 108 to valve head 82 of the shift valve 50 and the spring pocket 88 of the shift valve 52. The fluid passage 92 couples the output passage 158 of the electro-hydraulic actuator 110 to the valve head 84 of the shift valve 52 and the spring pocket 86 of the shift valve 50.

In operation, when the electro-hydraulic actuator 108 is actuated (FIG. 4), fluid pressure is output to the valve head 82 of the shift valve 50 and to the spring pocket 88 of the shift valve 52 at the same time, or at nearly the same time. Likewise, when the electro-hydraulic actuator 110 is actuated (FIG. 5), fluid pressure is output to the valve head 84 of the shift valve 52 and to the spring pocket 86 of the shift valve 50 at the same time, or at nearly the same time.

If both of the electro-hydraulic actuators 108, 110 are actuated at the same time (e.g., if one of the electro-hydraulic actuators 108, 110 is actuated, or remains actuated, in error) the fluid pressure directed to the spring pockets 86, 88 via the fluid passages 90, 92 prevents the shift valves 50, 52 from both stroking at the same time, resulting in a valve state that looks similar to FIG. 3. Each one of the shift valves 50, 52 can only be stroked if the electro-hydraulic actuator 108, 110 coupled to the other of the shift valves 50, 52 is not actuated.

Thus, the shift valves 50, 52 have three possible states: a "00" state in which both of the shift valves 50, 52 are destroked, a "10" state in which the shift valve 50 is stroked and the shift valve 52 is prevented from stroking, and a "01" state in which the shift valve 50 is prevented from stroking and the shift valve 52 is stroked.

Further aspects of the fast valve actuation system 48 are described in U.S. Provisional Patent Application Ser. No. 61/287,003, filed Dec. 16, 2009, which is incorporated herein by this reference in its entirety.

FIGS. 3-6 illustrate possible states of the variator fault detection system 126. FIG. 3 illustrates a normal operating mode in which no variator faults are detected. FIG. 4 illustrates a valve state in which a fault may have occurred at the shift valve 50. FIG. 5 illustrates a valve state in which a fault may have occurred at the shift valve 52. FIG. 6 illustrates a valve state in which a variator fault (variator pressure too high) is detected.

Each of the shift valves 50, 52 resides in a valve chamber of a valve body of the electro-hydraulic control system 14. The shift valves 50, 52 are axially movable between destroked and stroked positions in their respective valve chambers. The valve chambers are omitted from the drawings for clarity.

The shift valve 50 selectively directs fluid pressure to the fluid passage S1 of a torque transferring mechanism 140 of the automatic transmission. The shift valve 52 selectively directs fluid pressure to the fluid passage S2 of a torque transferring mechanism 142 of the transmission 12. The torque transferring mechanisms 140, 142 are variator disk actuators, in accordance with the particular design of the transmission 12. As illustrated, the torque transferring mechanisms 140, 142 are opposing sides of the hydraulic piston/cylinder arrangement described above.

The shift valve 50 includes a valve head 82, a spring pocket 86, and a number of axially-spaced lands 144, 146, 148 therebetween. The lands 144, 146, 148 define a pair of ports 94, 96. The spring pocket 86 contains a return spring 164, which biases the shift valve 50 in the destroked position shown in FIGS. 3, 5 and 6.

Similarly, the shift valve 52 includes a valve head 84, a spring pocket 88, and a number of axially-spaced lands 150, 152, 154 therebetween. The lands 150, 152, 154 define a pair of ports 98, 100. The spring pocket 88 contains a return spring 166, which biases the shift valve 52 in the destroked position shown in FIGS. 3, 4, and 6.

The shift valve 50 is fluidly coupled to an electro-hydraulic actuator 108 by an output passage 156. A source of pressurized hydraulic fluid 54 feeds fluid pressure to the electro-hydraulic actuator 108 through a fluid passage 160. The electro-hydraulic actuator 108 selectively outputs the fluid pressure to either the output passage 156 or to an exhaust chamber 106, in response to electrical signals issued by the electronic control unit 16.

In the illustrations, the electro-hydraulic actuator 108 is a normally-low, on-off solenoid valve. When the electro-hydraulic actuator 108 receives electrical input (i.e. current or voltage) from the electronic control unit 16 (i.e., the electro-hydraulic actuator 108 is "actuated"), the electro-hydraulic actuator 108 outputs fluid pressure from the passage 160 to the output passage 156. In the absence of electrical input, the electro-hydraulic actuator 108 directs fluid pressure from the passage 160 to the exhaust chamber 106. When the electro-hydraulic actuator 108 is actuated, fluid pressure applied to the valve head 82 via the output passage 156 strokes the shift valve 50 as shown in FIG. 4.

In similar fashion to the shift valve 50, the shift valve 52 is fluidly coupled to an electro-hydraulic actuator 110 by an output passage 158. The source of pressurized hydraulic fluid 54 feeds fluid pressure to the electro-hydraulic actuator 110 through the fluid passage 160. The electro-hydraulic actuator 110 selectively outputs fluid pressure to either the output passage 158 or to an exhaust chamber 106, in response to electrical signals issued by the electronic control unit 16.

In the illustrations, the electro-hydraulic actuator 110 is a normally-low, on-off solenoid valve. When the electro-hydraulic actuator 110 receives electrical input from the electronic control unit 16 (i.e., the electro-hydraulic actuator 110 is "actuated"), the electro-hydraulic actuator 110 outputs fluid pressure from the passage 160 to the output passage 158. In the absence of electrical input, the electro-hydraulic actuator 110 directs fluid pressure from the passage 160 to an exhaust chamber 106. When the electro-hydraulic actuator 110 is actuated, fluid pressure applied to the valve head 84 via the output passage 158 strokes the shift valve 52 as shown in FIG. 5.

As shown in FIGS. 3-6, the port 94 of the shift valve 50 is in fluid communication with the fluid passage S1 of the torque transferring mechanism 140 both when the shift valve 50 is destroked and when the shift valve 50 is stroked. Similarly, the port 98 of the shift valve 52 is in fluid communication with the fluid passage S2 of the torque transferring mechanism 142 both when the shift valve 52 is destroked and when the shift valve 52 is stroked.

The trim systems 60, 62, and 112 are selectively in fluid communication with the fluid passages S1, S2, depending upon the position of the shift valves 50, 52. The trim system 60 is configured to control the application of fluid pressure to the fluid passage S1 when the shift valve 50 is destroked. The trim system 62 is configured to control the application of fluid pressure to the fluid passage S2 when the shift valve 52 is destroked.

When the shift valve 50 is stroked, the port 94 is disconnected from the trim system 60, as shown in FIG. 4. Similarly, when the shift valve 52 is stroked, the port 98 is disconnected from the trim system 62, as shown in FIG. 5. The trim system 112 is connected to the fluid passage S1 through the port 94 of the shift valve 50 when the shift valve 50 is stroked. The trim system 112 is connected to the fluid passage S2 through the port 98 of the shift valve 52 when the shift valve 52 is stroked.

In the variator fault detection system 126, a pair of sensing devices (e.g. pressure switches) are used to monitor the status of the shift valves 50, 52, detect faults occurring in the shift valves 50, 52 detect failures in the trim valves 60, 62 causing the variator pressure to be too high, or in the trim valves 60, 62, and report faults detected by a variator fault valve 118 to the electronic control unit 16. The ports 96, 100 of the shift valves 50, 52, are in fluid communication with pressure switches 102, 104, respectively, and with the variator fault valve 118.

The port 96 (and thus, the pressure switch 102) is pressurized when the shift valve 50 is stroked or when the shift valve 50 is destroked and the variator fault valve 118 is destroked. The port 100 (and thus, the pressure switch 104) is pressurized when the shift valve 52 is stroked or when the shift valve 52 is destroked and the variator fault valve 118 is destroked. The variator fault valve 118 is a two-position valve that is normally stroked, but it destrokes if the variator pressure output to the end load arrangement 80 is too high, i.e., is higher than the trim pressure input to the variator on lines S1, S2. When pressurized, the pressure switches 102, 104 send electrical signals to the electronic control unit 16.

As described above, there are instances during normal operation of the transmission 12 in which one or the other of the shift valves 50, 52 is stroked and the corresponding pressure switch 102, 104 is actuated. Accordingly, the electronic control unit 16 uses other information in combination with the signals generated by the pressure switches 102, 104, to determine whether a fault has occurred in one of the valves 50, 52, 60, 62.

The pressure switches 102, 104 are used to determine whether one of the shift valves 50, 52 may be stuck in the wrong position. FIG. 4 shows a configuration of the variator fault detection system 126 that may indicate a faulty shift valve 50. The shift valve 50 is stroked, actuating the pressure switch 102. The land 154 of the shift valve 52 is configured to allow enough fluid flow through the passage 160 to the chamber 96 to change the state of the pressure switch 102. Commonly referred to as a "tombstone," the land 154 may have an annulus on its top and bottom portions, to relieve pressure around the valve, balancing pressure (i.e. preventing side loads) or for other reasons.

To determine whether or not the shift valve 50 is operating normally, the electronic control unit 16 determines whether the electro-hydraulic actuator 108 is actuated or deactuated (i.e. on or off). If the electro-hydraulic actuator 108 is off, but the pressure switch 102 is actuated, then the electronic control unit 16 may determine that the shift valve 50 is stuck in the stroked position. Likewise, if the electro-hydraulic actuator 108 is on but the pressure switch 102 is not actuated, then the electronic control unit 16 may determine that the shift valve 50 is stuck in the destroked position.

Similarly, FIG. 5 shows a configuration of the variator fault detection system 126 that may indicate a faulty shift valve 52. The shift valve 52 is stroked, actuating the pressure switch 104. To determine whether or not the shift valve 52 is operating normally, the electronic control unit 16 determines whether the electro-hydraulic actuator 110 is actuated or deactuated (i.e. on or off). If the electro-hydraulic actuator 110 is off, but the pressure switch 104 is actuated, then the electronic control unit 16 may determine that the shift valve 52 is stuck in the stroked position. Likewise, if the electro-hydraulic actuator 110 is on but the pressure switch 104 is not actuated, then the electronic control unit 16 may determine that the shift valve 52 is stuck in the destroked position.

FIG. 6 shows a configuration of the variator fault detection system 126 in which a variator fault is detected by the variator fault valve 118. If a variator fault (i.e. a malfunction that causes the variator pressure to be too high) occurs, the variator fault valve 118 destrokes.

When both of the shift valves 50, 52 are destroked, both of the electro-hydraulic actuators 108, 110 are deactuated (i.e., off). In this scenario, destroking of the variator fault valve 118 couples the passage 128 to both of the ports 96, 100, and both of the pressure switches 102, 104 are actuated by fluid pressure supplied by the pressure source 54 through the variator fault valve 118. Thus, the "11" state indicates that both of the pressure switches 102, 104 are actuated, not that the shift valves 50, 52 are both stroked. This is possible because the passages 90, 92 prevent the shift valves 50, 52 from attaining the "11" state (i.e. a state in which both of the shift valves are stroked at the same time).

The "11" state is also used by the pressure switches 102, 104 in combination with the variator fault valve 118 and other information to determine whether one of the trim valves 60, 62 has failed causing the variator pressure to be too high. If the shift valve 50 is stroked when a variator fault occurs, the pressure switch 102 is actuated by fluid pressure via the passage 160 as shown in FIG. 4. If the variator fault valve 118 detects high variator pressure at the same time as the shift valve 50 is stroked, only the pressure switch 104 is pressurized by the output of the variator fault valve 118 through the passage 128, because the passage 128 to the shift valve 50 is blocked by the land 146 when the shift valve 50 is stroked. Nonetheless, both of the pressure switches 102, 104 are actuated, indicating a variator fault.

In this scenario, the electronic control unit 16 determines that the electro-hydraulic actuator 108 is actuated. This information, in combination with the "11" state of the pressure switches 102, 104, indicates that a failure has occurred at the trim valve 62. This is so because when the shift valve 50 is stroked, the trim valve 60 is blocked (i.e., not outputting fluid pressure to the variator line S1) as shown in FIG. 4 and described above.

Similarly, if the shift valve 52 is stroked when a variator fault occurs, the pressure switch 104 is actuated by fluid pressure via the passage 160 as shown in FIG. 5. If the variator fault valve 118 detects high variator pressure at the same time as the shift valve 52 is stroked, only the pressure switch 102 is pressurized through the passage 128, because the passage 128 to the shift valve 52 is blocked by the land 152 when the shift valve 52 is stroked. Nonetheless, both of the pressure switches 102, 104 are actuated, indicating a variator fault.

In this scenario, the electronic control unit 16 determines that the electro-hydraulic actuator 110 is actuated. This information, in combination with the "11" state of the pressure switches 102, 104, indicates that a failure has occurred at the trim valve 60. This is so because when the shift valve 52 is stroked, the trim valve 62 is blocked (i.e. not outputting fluid pressure to the variator line S2) as shown in FIG. 5 and described above.

Table 1 below summarizes fault conditions detected by the pressure switches 102, 104, as described in this disclosure, where "0" denotes a destroked, off, or deactuated state and "1" denotes a stroked, on, or actuated state.

TABLE 1

| Pressure Switch 102 | Pressure Switch 104 | Actuator 108 | Actuator 110 | Variator Fault Valve 118 | Location of Fault |
|---|---|---|---|---|---|
| 0 | 0 | 0 | 0 | 0 | Variator |
| 1 | 0 | 0 | 0 | 1 | Shift Valve 50 |
| 1 | 0 | 1 | 1 | 1 | Shift Valve 52 |
| 1 | 1 | 1 | 0 | 0 | Trim Valve 62 |
| 0 | 1 | 0 | 0 | 1 | Shift Valve 52 |
| 0 | 1 | 1 | 1 | 1 | Shift Valve 50* |
| 1 | 1 | 0 | 1 | 0 | Trim Valve 60 |

The asterisk (*) in row 6 of Table 1 is used to denote a state that, in the illustrated embodiment, may be commanded (erroneously, perhaps), but not achieved. That is, actuating both of the actuators 108, 110 will not cause both of the shift valves 50, 52 to be stroked, because the configuration of the shift valves 50, 52 prevents simultaneous stroking, as described above.

If any of the above-described faults occurs, the backup trim system 112 is implemented to enable the vehicle to "limp home" as described in the aforementioned U.S. Provisional Patent Application Ser. No. 61/286,974.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. A variator fault detection circuit, comprising
  a first shift valve movable from a first position to a second position axially spaced from the first position in a first valve chamber of a hydraulic control circuit for a continuously variable transmission, the first shift valve having a first port in fluid communication with a variator of the continuously variable transmission and a second port axially spaced from the first port,
  a second shift valve movable from a first position to a second position axially spaced from the first position in a second valve chamber of the hydraulic control circuit of the continuously variable transmission, the second shift valve having a first port in fluid communication with the variator of the continuously variable transmission and a second port axially spaced from the first port,
  a first pressure switch coupled to the second port of the first shift valve,
  a second pressure switch coupled to the second port of the second shift valve,
  a first electro-hydraulic actuator coupled to the first shift valve, and a second electro-hydraulic actuator coupled to the second shift valve.

2. The variator fault detection circuit of claim 1, wherein the first position of the first shift valve is a destroked position and the second position of the first shift valve is a stroked position.

3. The variator fault detection circuit of claim 2, wherein the first position of the second shift valve is a destroked position and the second position of the second shift valve is a stroked position.

4. The variator fault detection circuit of claim 3, comprising a first trim valve operable to output variable fluid pressure, wherein the first trim valve is fluidly coupled to the first port of the first shift valve when the first shift valve is in the first position, and the first trim valve is disconnected from the first port of the first shift valve when the first shift valve is in the second position.

5. The variator fault detection circuit of claim 4, comprising a second trim valve operable to output variable fluid pressure, wherein the second trim valve is fluidly coupled to the first port of the second shift valve when the second shift valve is in the first position, and the second trim valve is disconnected from the first port of the second trim valve when the second shift valve is in the second position.

6. A shift valve fault detection method executable by an electronic control unit using the variator fault detection circuit of claim 1, comprising:
    detecting a status of the first pressure switch,
    detecting a status of the first electro-hydraulic actuator, and
    determining whether a fault has occurred at the first shift valve based on the status of the first pressure switch and the status of the first electro-hydraulic actuator.

7. The shift valve fault detection method of claim 6, comprising initiating a failure recovery action in response to determining that a fault has occurred at the first shift valve.

8. The shift valve fault detection method of claim 6, comprising detecting a status of the second pressure switch, detecting a status of the second electro-hydraulic actuator, and determining whether a fault has occurred at the second shift valve based on the status of the second pressure switch and the status of the second electro-hydraulic actuator.

9. A variator fault detection circuit, comprising
    a first shift valve movable from a first position to a second position axially spaced from the first position in a first valve chamber of a hydraulic control circuit for a continuously variable transmission, the first shift valve having a first port in fluid communication with a variator of the continuously variable transmission and a second port axially spaced from the first port,
    a second shift valve movable from a first position to a second position axially spaced from the first position in a second valve chamber of the hydraulic control circuit of the continuously variable transmission, the second shift valve having a first port in fluid communication with the variator of the continuously variable transmission and a second port axially spaced from the first port,
    a first pressure switch coupled to the second port of the first shift valve,
    a second pressure switch coupled to the second port of the second shift valve, and
    a variator fault valve selectively coupled to the second port of the first shift valve and selectively coupled to the second port of the second shift valve.

10. The variator fault detection circuit of claim 9, wherein the variator fault valve has a first position and a second position axially spaced from the first position, and the variator fault valve outputs fluid pressure to at least one of the second port of the first shift valve and the second port of the second shift valve when the variator fault valve is in the second position.

11. The variator fault detection circuit of claim 10, wherein the variator fault valve only outputs fluid pressure to the second port of the first shift valve when the first shift valve is in the first position and the variator fault valve is in the second position.

12. The variator fault detection circuit of claim 11, wherein the variator fault valve only outputs fluid pressure to the second port of the second shift valve when the second shift valve is in the first position and the variator fault valve is in the second position.

13. A variator fault detection method executable by an electronic control unit using the variator fault detection circuit of claim 9, comprising:
    detecting a status of the first pressure switch,
    detecting a status of the second pressure switch, and
    determining whether a variator fault has occurred based on the status of the first pressure switch and the status of the second pressure switch.

14. The variator fault detection method of claim 13, wherein the determining step comprises determining whether the first and second pressure switches are both actuated.

15. The variator fault detection method of claim 14, comprising initiating a fault recovery action if the status of the first pressure switch is actuated and the status of the second pressure switch is actuated.

16. A variator trim system fault detection circuit, comprising
    a first shift valve movable from a first position to a second position axially spaced from the first position in a first valve chamber of a hydraulic control circuit for a continuously variable transmission, the first shift valve having a first port in fluid communication with the variator of a continuously variable transmission and a second port axially spaced from the first port,
    a second shift valve movable from a first position to a second position axially spaced from the first position in a second valve chamber of the hydraulic control circuit of the continuously variable transmission, the second shift valve having a first port in fluid communication with the variator of the continuously variable transmission and a second port axially spaced from the first port,
    a first trim valve operable to output variable fluid pressure, the first trim valve being fluidly coupled to the first port of the first shift valve when the first shift valve is in the first position, and the first trim valve being disconnected from the first port of the first shift valve when the first shift valve is in the second position,
    a second trim valve operable to output variable fluid pressure, the second trim valve being fluidly coupled to the first port of the second shift valve when the second shift valve is in the first position, and the second trim valve being disconnected from the first port of the second trim valve when the second shift valve is in the second position,
    a first pressure switch coupled to the second port of the first shift valve,
    a second pressure switch coupled to the second port of the second shift valve,
    a first electro-hydraulic actuator coupled to the first shift valve,
    a second electro-hydraulic actuator coupled to the second shift valve, and a variator fault valve selectively coupled to the second port of the first shift valve and selectively coupled to the second port of the second shift valve.

17. The variator trim system fault detection circuit of clam 16, wherein each of the first and second shift valves has a valve head and a spring pocket axially spaced from the valve head, comprising a first passage fluidly coupling the valve head of the first shift valve to the spring pocket of the second shift valve.

18. The variator trim system fault detection circuit of claim 17, comprising a second passage fluidly coupling the valve head of the second shift valve to the spring pocket of the first shift valve.

19. A variator trim system fault detection method executable by an electronic control unit using the variator trim system fault detection circuit of claim 16, comprising
detecting a status of the first pressure switch,
detecting a status of the second pressure switch,
detecting a status of the second electro-hydraulic actuator, and
determining whether a fault has occurred at the first trim valve based on the status of the first pressure switch, the status of the second pressure switch, and the status of the second electro-hydraulic actuator.

20. The variator trim system fault detection method of claim 19, comprising initiating a failure recovery action in response to determining that a fault has occurred at the first trim valve.

21. The variator trim system fault detection method of claim 19, comprising detecting a status of the first electro-hydraulic actuator, and determining whether a fault has occurred at the second shift valve based on the status of the first pressure switch, the status of the second pressure switch, and the status of the first electro-hydraulic actuator.

* * * * *